United States Patent
He et al.

(10) Patent No.: US 11,706,288 B1
(45) Date of Patent: Jul. 18, 2023

(54) METHOD, ELECTRONIC DEVICE, AND COMPUTER PROGRAM PRODUCT FOR PROCESSING QUERY REQUEST

(71) Applicant: Dell Products L.P., Round Rock, TX (US)

(72) Inventors: Bin He, Shanghai (CN); Wenlei Wu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/879,153

(22) Filed: Aug. 2, 2022

(30) Foreign Application Priority Data

Jul. 15, 2022 (CN) .......................... 202210835751.X

(51) Int. Cl.
  *H04L 67/10* (2022.01)
  *G06F 16/29* (2019.01)
  *G08G 1/01* (2006.01)

(52) U.S. Cl.
  CPC .............. *H04L 67/10* (2013.01); *G06F 16/29* (2019.01); *G08G 1/0125* (2013.01)

(58) Field of Classification Search
  CPC ........ H04L 67/10; G06F 16/29; G08G 1/0125
  See application file for complete search history.

(56) References Cited

U.S. PATENT DOCUMENTS

| 11,470,535 B1 * | 10/2022 | Thomason | H04L 67/02 |
| 2021/0345075 A1 * | 11/2021 | Jha | H04W 4/023 |
| 2022/0179868 A1 * | 6/2022 | Mortazavi | G06F 16/2471 |

OTHER PUBLICATIONS

E. Katz-Bassett et al., "Towards IP Geolocation Using Delay and Topology Measurements," Proceedings of the 2006 ACM SIGCOMM Internet Measurement Conference, Oct. 25-27, 2006, 13 pages.
D. Farinacci et al., "The Locator/ID Separation Protocol (LISP)," Internet Engineering Task Force, https://datatracker.ietf.org/doc/html/rfc6830, Jan. 2013, 75 pages.
K. Sahr et al., "Geodesic Discrete Global Grid Systems," Cartography and Geographic Information Science, vol. 30, No. 2, 2003, pp. 121-134.
Amazon Web Services, Inc. "AWS Wavelength," https://aws.amazon.com/wavelength/, Accessed Aug. 2, 2022, 5 pages.
(Continued)

*Primary Examiner* — Cheikh T Ndiaye
(74) *Attorney, Agent, or Firm* — Ryan, Mason & Lewis, LLP

(57) ABSTRACT

Embodiments of the present disclosure relate to a method, an electronic device, and a computer program product for processing a query request. The method includes determining a first number of requests of a first edge device and a second number of requests of a second edge device in a distributed system. The method further includes determining the first edge device as a parent node and the second edge device as a child node in response to both the first number of requests and the second number of requests being less than a threshold. The method further includes sending to the child node an indication of transmitting data in the child node to the parent node. The method further includes sending, in response to receiving a query request for the child node, the query request to the parent node.

20 Claims, 7 Drawing Sheets

(56) References Cited

OTHER PUBLICATIONS

Geonet, "Geographic Network Tools," https://geonet.shodan.io/, Accessed Aug. 2, 2022, 3 pages.
Uber Technologies, Inc. "H3," https://h3geo.org/docs/, Accessed Aug. 2, 2022, 1 page.
Wikipedia, "Geohash," https://en.wikipedia.org/wiki/Geohash, May 15, 2022, 7 pages.
Wikipedia, "Locator/Identifier Separation Protocol," https://en.wikipedia.org/wiki/Locator/Identifier_Separation_Protocol, May 12, 2022, 4 pages.
Wikipedia, "Global Positioning System," https://en.wikipedia.org/wiki/Global_Positioning_System, Aug. 1, 2022, 30 pages.
S. Burrows, "What is a Geo-cluster and How Can it Help Prevent Data Loss?," https://www.ontrack.com/en-gb/blog/what-is-a-geo-cluster-and-how-can-it-help-prevent-data-loss, Sep. 23, 2015, 2 pages.
D. Moore et al., "Where in the World is netgeo.caida.org?" https://web.archive.org/web/20171204211044/http://www.isoc.org/inet2000/cdproceedings/posters/226/#overview, Accessed Aug. 2, 2022, 9 pages.
Cdyne Corporation, "IP2Geo," https://wiki.cdyne.com/IP2Geo, Accessed Aug. 2, 2022, 5 pages.
Google Chrome, "Geotrack Email Tracking with Geolocation," https://chrome.google.com/webstore/detail/geotrack-email-tracking-w/ciajnfanflofkddjdanppgnlpkkdclln?hl=en, Accessed Aug. 2, 2022, 1 page.

\* cited by examiner

METHOD, ELECTRONIC DEVICE, AND COMPUTER PROGRAM PRODUCT FOR PROCESSING QUERY REQUEST

RELATED APPLICATION(S)

The present application claims priority to Chinese Patent Application No. 202210835751.X, filed Jul. 15, 2022, and entitled "Method, Electronic Device, and Computer Program Product for Processing Query Request," which is incorporated by reference herein in its entirety.

FIELD

Embodiments of the present disclosure relate to the field of computers, and more particularly, to a method, an electronic device, and a computer program product for processing a query request.

BACKGROUND

In traffic service scenarios, the information of many events (such as accidents, traffic jams, and parking) is only useful to nearby vehicles or to necessary facilities in a specific region, and therefore, traffic services may hope to append geographic information to device ID numbers (such as IP addresses or other specific ID schemes). Therefore, when assigning or processing such device ID numbers, a traffic service may know a location where a device will make decisions based on further service requirements, such as sending notifications to vehicles registered in the region, or maintaining locally processed geo-related data. In general, setting up a local server can effectively reduce the service response time; however, aggregating data in a distributed system may increase the query and response time. Moreover, despite the problem of cost-effectiveness, some regions may not have enough users and requests in practice. In addition, transportation scenarios are dynamic, and requests in a region may peak during business hours and be low for the rest of the day. Therefore, a need exists for a distributed system with enhanced flexibility in dynamically covering request regions.

SUMMARY

Embodiments of the present disclosure provide a method, an electronic device, and a computer program product for processing a query request.

According to a first aspect of the present disclosure, a method for processing a query request is provided. The method includes determining a first number of requests of a first edge device and a second number of requests of a second edge device in a distributed system. The method further includes determining the first edge device as a parent node and the second edge device as a child node in response to both the first number of requests and the second number of requests being less than a threshold. The method further includes sending to the child node an indication of transmitting data in the child node to the parent node. The method further includes sending, in response to receiving a query request for the child node, the query request to the parent node.

According to a second aspect of the present disclosure, an electronic device is also provided. The electronic device includes a processor and a memory coupled to the processor. The memory has instructions stored therein, and the instructions, when executed by the processor, cause the electronic device to perform actions. The actions include determining a first number of requests of a first edge device and a second number of requests of a second edge device in a distributed system. The actions further include determining the first edge device as a parent node and the second edge device as a child node in response to both the first number of requests and the second number of requests being less than a threshold. The actions further include sending to the child node an indication of transmitting data in the child node to the parent node. The actions further include sending, in response to receiving a query request for the child node, the query request to the parent node.

According to a third aspect of the present disclosure, a computer program product is provided. The computer program product is tangibly stored on a non-transitory computer-readable medium and includes computer-executable instructions, wherein the computer-executable instructions, when executed by a device, cause the device to perform the method according to the first aspect.

This Summary is provided to introduce the selection of concepts in a simplified form, which will be further described in the Detailed Description below. The Summary is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

In all the accompanying drawings, identical or similar reference numerals indicate identical or similar elements.

DETAILED DESCRIPTION

Figure 1:
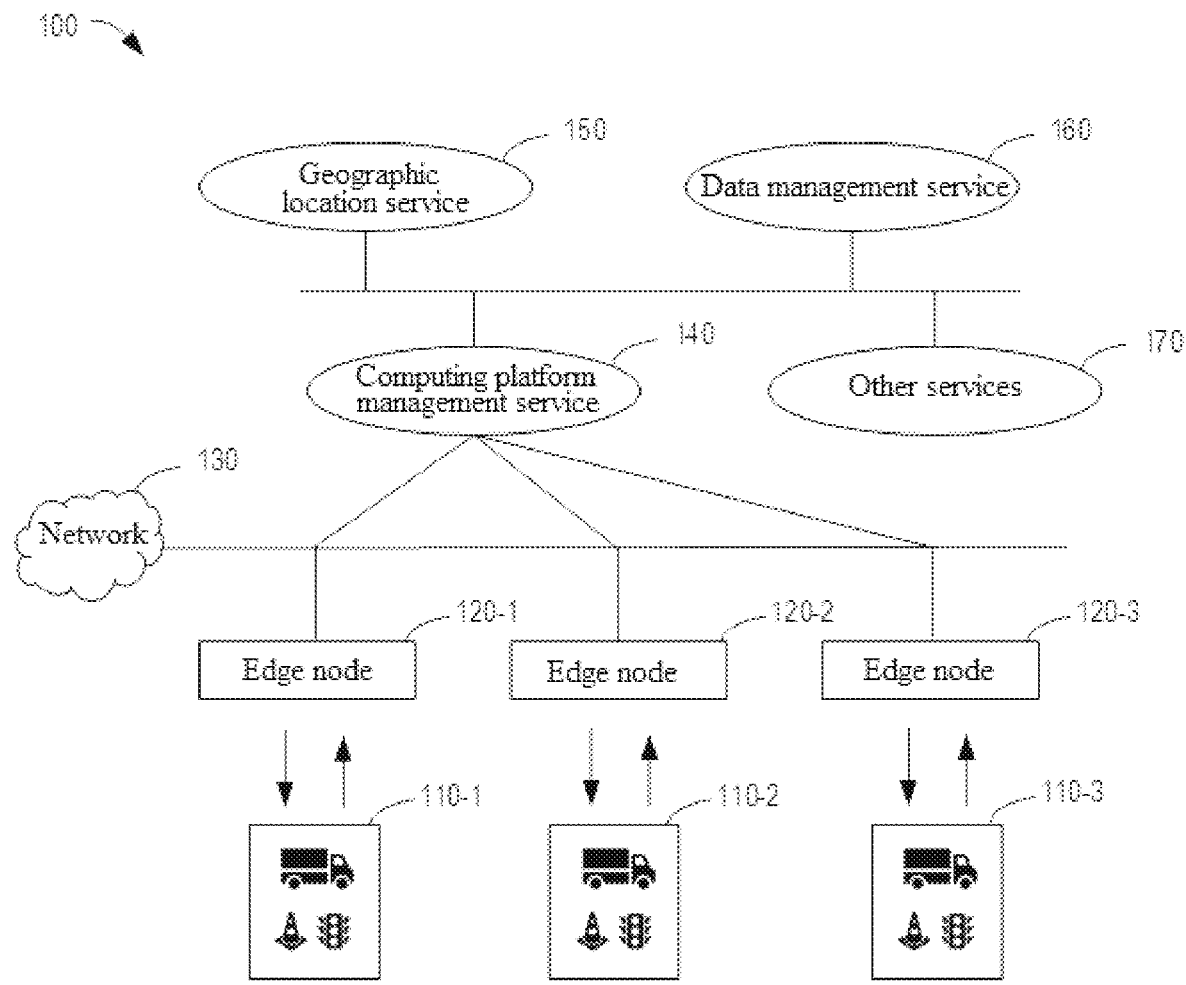
FIG. 1 is a schematic diagram of an example environment in which an embodiment of the present disclosure may be implemented.

Embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid understanding, and are not intended to limit the scope.

In mobile traffic services, many queries and requests are associated with geographic locations. Therefore, using characteristics of a distributed system to set up some edge computing devices can provide better services. However, aggregating data in a distributed system may increase the query and response time. Moreover, despite the problem of cost-effectiveness, some regions may not have enough users and requests in practice. In addition, transportation scenarios are dynamic, and requests in a region may peak during business hours and be low for the rest of the day. Therefore, a need exists for a distributed system with enhanced flexibility in dynamically covering request regions.

Typically, when dealing with distributed content, in order to reduce the service waiting time, data will be placed into a distributed network that may distribute the content to those terminal users who are willing to consume data in a network topology. Another common pattern is a centralized query service where all events or requests are redirected to sub-region servers. However, requests in a region are dynamically related to geographic locations, instead of being associated with the network topology. Moreover, it is further required to achieve a balance between the query response time and numbers of requests in different time periods.

In order to address the above defects, embodiments of the present disclosure provide a solution for processing a query request. In the solution, edge computing devices in a distributed system are divided into a parent node and child nodes based on degrees of busyness. Data of the child nodes is aggregated to the parent node. When the child nodes are not too busy, the parent node uniformly handles query requests for its child nodes.

FIG. 1 is a schematic diagram of example environment 100 in which an embodiment of the present disclosure may be implemented.

As shown in FIG. 1, example environment 100 may include edge node 120-1, edge node 120-2, and edge node 120-3 (referred to individually or collectively as edge node 120). Edge node 120 is a computing device configured to store information about traffic events, respond to query requests for events, and the like. The number of edge nodes may be configured as desired, so environment 100 may include more edge nodes 120. In the following, nodes, child nodes, and edge nodes are not strictly distinguished because they are all computing devices in a distributed system.

Example environment 100 may include event 110-1, event 110-2, and event 110-3 (referred to individually or collectively as event 110). Edge node 120-1 may acquire (e.g., receive) event 110-1, edge node 120-2 may acquire event 110-2, and edge node 120-3 may acquire event 110-3. Based on a configuration, each edge node 120 manages event 110 that occurs within a particular region. When event 110-1 occurs in a management region of edge node 120-1, event 110-1 will be recorded in edge node 120-1. It may be understood that a geographic location where an event occurs is coupled with a certain edge node.

Network 130 may be further included in environment 100. Various devices in the environment may communicate with each other via network 130. Computing platform management service 140 is further included in environment 100. Computing platform management service 140 will control and manage edge nodes 120. For example, which edge node 120 will respond to a query request for edge node 120 will be determined by computing platform management service 140. Computing platform management service 140 manages registration, authorization, connection, and health status of edge nodes, an ID of edge node 120, and a route locator. By storing a route locator and geohash for the ID of edge node 120, geolocation may be used for identifying a namespace of the edge node.

Geographic location service 150 may be further included in environment 100. Geographic location service 150 may provide a geohash that determines geographic regions in which events are managed by edge node 120. Geographic location service 150 maintains a geohash function, manages geohash assignment, performs geocomputation, resolves a geolocation, and stores geohashes for parent and child nodes.

Data management service 160 may be further included in environment 100. Data management service 160 manages data aggregation and processes queries from a service portal. For example, a query for event 110-1 from a user terminal will be processed by data management service 160.

It is to be understood that the above services are logically configured in a distributed system, and for the convenience of description in the present disclosure, it is not actually necessary to separate these services. Other services 170 may be further included in environment 100. This will be determined by a transportation service operator, or by a consumer subscribing to a service, such as service lifecycle management, access network and virtual network accessibility, security, and account management. Therefore, these services are only exemplified in the present disclosure but are not used as limitations to the present disclosure.

It should be understood that the architecture and functions of example environment 100 are described for illustrative purposes only, without implying any limitation to the scope of the present disclosure. Embodiments of the present disclosure may also be applied to other environments having different structures and/or functions.

A process according to an embodiment of the present disclosure will be described in detail below with reference to FIG. 2. For ease of understanding, the specific data mentioned in the following description are all illustrative and are not intended to limit the scope of protection of the present disclosure. It should be understood that the embodiment described below may also include additional actions not shown and/or may omit actions shown, and the scope of the present disclosure is not limited in this regard.

Figure 2:
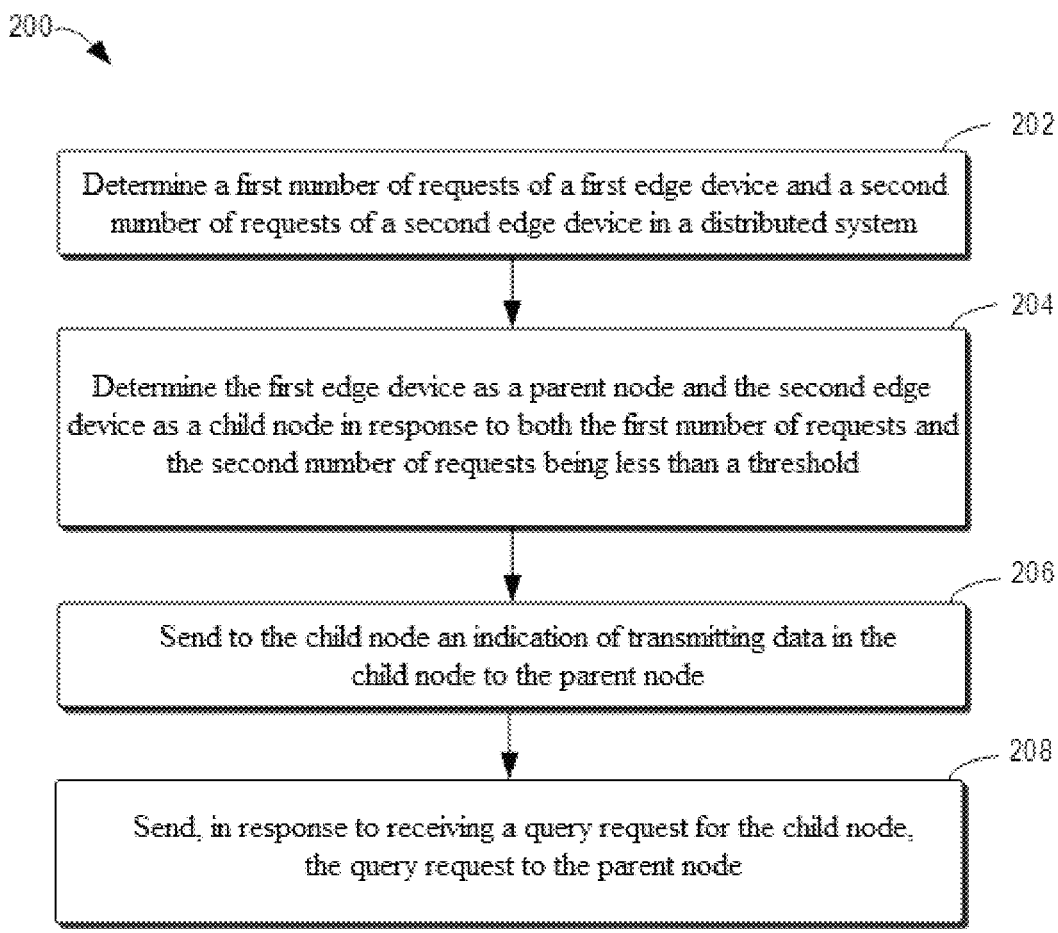
FIG. 2 is a flow chart of a method for processing a query request according to an example implementation of the present disclosure.

FIG. 2 is a flow chart of method 200 for processing a query request according to an example implementation of the present disclosure.

At block 202, a first number of requests of a first edge device and a second number of requests of a second edge device in a distributed system are determined. For example, a first number of requests of edge node 120-1 is determined, and a second number of requests of edge node 120-2 is determined. Each edge node 120 is responsible for a region, but the numbers of events in the regions may be different, and therefore, it is necessary to know a degree of busyness of each edge node 120 in the distributed system. The number of requests may reflect the degree of busyness.

At block 204, in response to both the first number of requests and the second number of requests being less than a threshold, the first edge device is determined as a parent node and the second edge device is determined as a child node. When both the first number of requests and the second number of requests are less than the threshold, it means that the two edge nodes are not particularly busy. Therefore, a subsequent aggregation operation may be performed on the two nodes. For example, edge node 120-1 is determined as a parent node, and edge node 120-2 is determined as a child node.

At block 206, an indication of transmitting data in the child node to the parent node is sent to the child node. The child node stores event information of a region it manages, as well as some other metadata. These events in child node 120-2 are all aggregated to the parent node, so that parent node 120-1 obtains the data of the child node.

At block 208, in response to receiving a query request for the child node, the query request is sent to the parent node. As an example, parent node 120-1 has acquired the data of child node 120-2 at this time, so at this time, parent node 120-1 directly processes a query request that is originally processed by child node 120-2. The query request may include a query for an engine number of a certain vehicle, a query for a road condition, and the like, and this is not limited in the present disclosure.

With method 200 of the present disclosure, based on different degrees of busyness, data in less busy nodes is aggregated to an upper-level node, and the upper-level node directly processes query requests for the lower-level nodes. In this way, there is no need to query each node one by one, which saves routing time, reduces the number of query hops, and reduces the delay.

In some embodiments, in response to a third number of requests of a third edge device in the distributed system being greater than the threshold, a query request for the third edge device is sent to the parent node, so that the query request for the third edge device is forwarded to the third edge device. As an example, when it is determined that the number of requests of edge node 120-3 is greater than the threshold, it means that edge node 120-3 is relatively busy, and the mechanism at this time is enabling the busy edge node to process its own query requests. Therefore, when receiving a query request for edge node 120-3, parent node 120-1 at the upper level sends the query request to edge node 120-3 itself. The advantage is that the parent node will not be overly busy that affects the performance of hosting other child nodes.

In some embodiments, a response to the query request is determined in response to the parent node receiving the query request; and the response is caused to be sent from the parent node. Assuming that the query request is to request an engine number of a certain vehicle, and the vehicle is in a region of edge node 120-2, then the query request may be directly processed by its parent node 120-1. For a parent node, since data of its child nodes have already been aggregated to the parent node, then parent node 120-1 directly determines a response to the query request. The response may be sent directly from the parent node without any action by child node 120-2. Similarly, this saves the routing time from the parent node to the child node, reduces the number of query hops, and reduces the delay.

Figure 3:
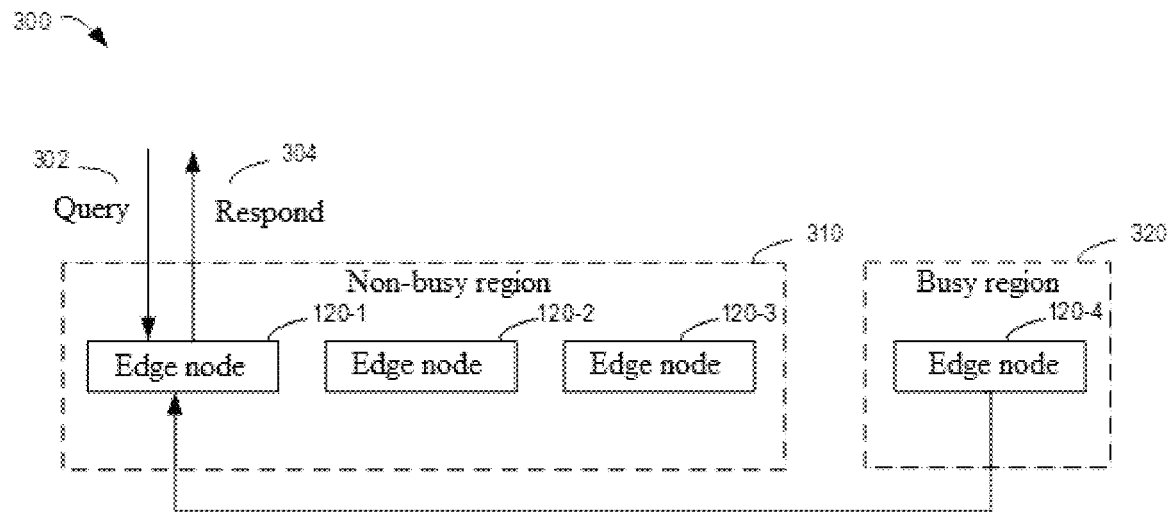
FIG. 3 is a block diagram of a node aggregation result according to an example implementation of the present disclosure.

FIG. 3 is a block diagram of node aggregation result 300 according to an example implementation of the present disclosure. Method 200 may aggregate various edge nodes in the distributed system, and edge nodes that meet an aggregation condition are logically aggregated together to process query requests as a whole. As depicted, dashed box 310 represents edge nodes that are aggregated together, where edge node 120-1 is the parent node, and edge node 120-2 (also referred to as a first child node) and edge node 120-3 (also referred to as a second child node) are child nodes. Dashed box 320 represents an individual edge node, which processes a query request for itself. Edge node 120-4 (also referred to as a third child node) is included in dashed box 320. Therefore, edge node 120-4 will process a query request by itself. For example, query 302 is forwarded to edge node 120-4 via parent node 120-1. After edge node 120-4 determines response 304 to query 302, response 304 is sent to parent node 120-1 and sent out via parent node 120-1.

Figure 4:
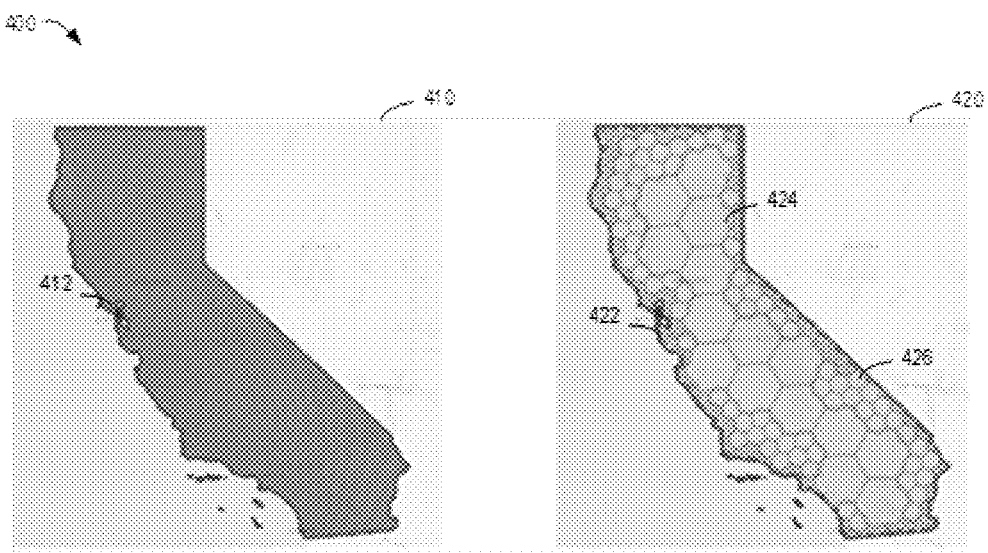
FIG. 4 is a schematic diagram of an instance of a node aggregation result according to an example implementation of the present disclosure.
Figures 5, 6:
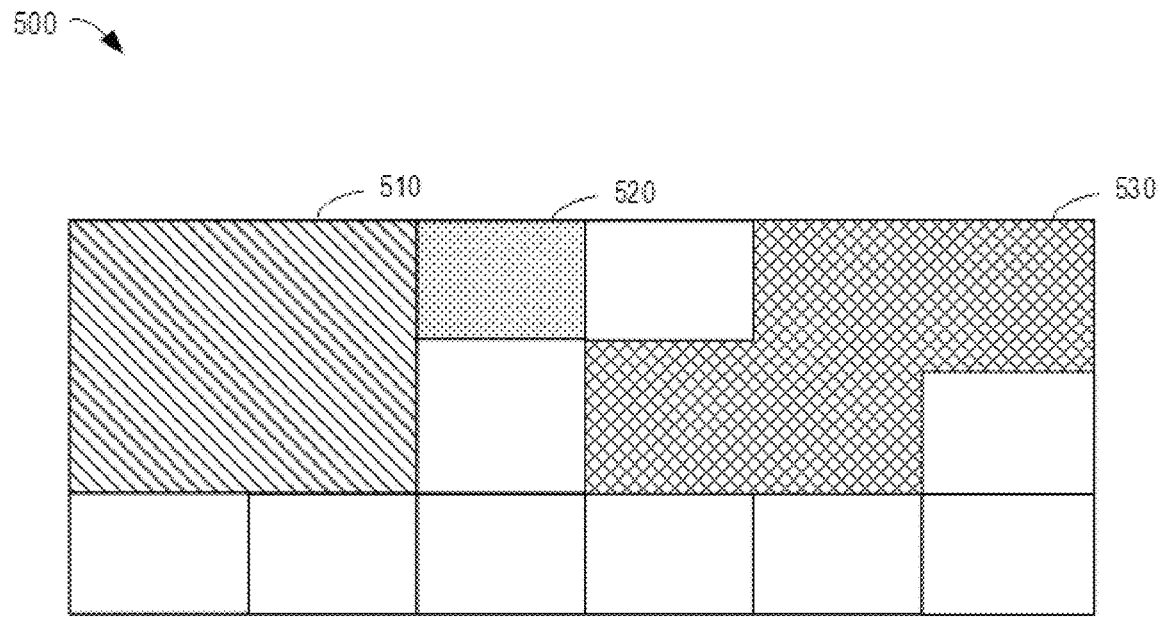
FIG. 5 is a schematic diagram of an abstract of a node aggregation result according to an example implementation of the present disclosure.
FIG. 6 is a schematic diagram of geohashes according to an example implementation of the present disclosure.

FIG. 4 is a schematic diagram of instance 400 of a node aggregation result according to an example implementation of the present disclosure. FIG. 5 is a schematic diagram of abstract 500 of a node aggregation result according to an example implementation of the present disclosure. The benefits of implementing node aggregation will be described below with reference to FIG. 4 and FIG. 5.

At block 410, a schematic diagram of a region without node aggregation is shown, where city 412 has the same number of edge nodes deployed as other remote regions. However, it is obvious that query requirements near the city will be significantly higher than those in the remote regions. At block 420, a schematic diagram of regions after node aggregation is shown. At block 420, there are dense nodes 422 at city 412, and there will be few aggregations since the number of requests here is generally greater than a threshold. However, in a remote region, such as region 424, there are sparse nodes, and each node will manage requests from a large region. At region 426, there are moderately aggregated nodes, and each node will manage a moderately sized region.

It is to be understood that in FIG. 5, region 520 represents a region originally managed by a node. Regions 510 and 530 represent regions managed by nodes that are aggregated together. The regions managed by the aggregated nodes do not necessarily have the same shape or the same size. Whether nodes are aggregated and how many nodes are aggregated depend mainly on the degree of busyness, and the degree of busyness depends mainly on the number of requests. In some embodiments, after aggregation, in order to balance the number of requests and a distance between an event and an edge node, the number of aggregated child nodes may be dynamically adjusted. Therefore, data may be queried in a distributed system at a relatively centralized location and with less traffic.

In some embodiments, parent and child nodes are assigned corresponding geohashes. The geohashes are used for identifying geographic locations and corresponding nodes. FIG. 6 is a schematic diagram 600 of geohashes according to an example implementation of the present disclosure. How the geohashes are determined will be described below with reference to FIG. 6.

In some embodiments, a geographic region is divided into a first-level grid set. For example, if the geographic region is divided into 4 grids, the 4 grids are referred to as first-level grid set 610. Each first-level grid in first-level grid set 610 is further divided into a second-level grid set. For example, grid 610-2 in first-level grid set 610 is divided into grid 620-2 in first-level grid set 620. Grid 620-2 has 4 sub-grids. A prefix of each sub-grid is consistent with a prefix of first-level grid 610-2 (being 2 in this example).

In some examples, each grid in the second-level grid set may be further divided into third-level grids in a third-level grid set 630. For example, second-level grid 620-13 is divided into 4 third-level grids 630-13. Third-level grid 630-13 has 4 sub-grids, and each sub-grid has the same prefix as that of its second-level grid (being 13 in this example).

A geohash for each grid in the first-level grid set and a geohash for each grid in the second-level grid set are determined. A hash of each grid may be calculated for representing a corresponding computing node.

In this way, a distributed system of namespace is identified by geohashes. Each edge computing node may use the hash to identify the geographic location and identity of the edge node, so as to separate an edge computing platform from the network topology. A geographic location service may ensure that a child node and its parent node can always find each other by parsing a geohash. Moreover, each hash is unique and confidential, and therefore, queries can be made based on geohashes. For example, in the case of passthrough, a query may be performed by a geographic location instead of searching for a server name or network address.

In some embodiments, in response to receiving a registration request to register a fourth edge device with the distributed system, a corresponding geohash is assigned to the fourth edge device; and the parent node is notified of the geohash of the fourth edge device. It is to be understood that if a new edge device needs to be added to the distributed system, authentication by the distributed system and some configuration steps are required.

Figure 7:
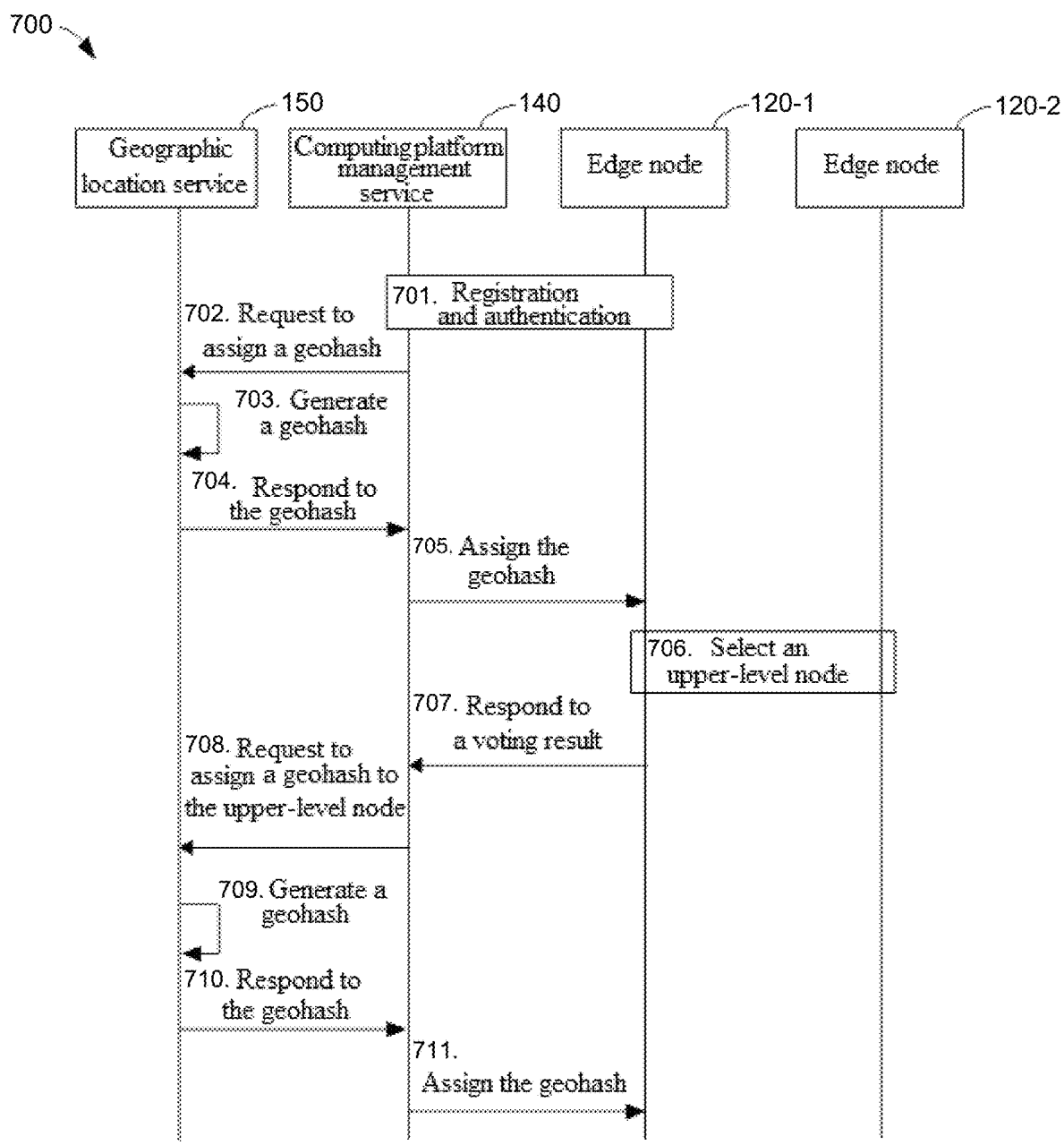
FIG. 7 is a schematic diagram of node initialization according to an example implementation of the present disclosure.

FIG. 7 is a schematic diagram 700 of node initialization according to an example implementation of the present disclosure. How to add a new edge node to a distributed system will be described below with reference to FIG. 7. In FIG. 7, it is assumed that edge node 120-1 has not joined the distributed system.

At 701, edge node 120-1 registers itself with the distributed system. Computing platform management service 140 receives a request and validates the request. If the request is valid, edge node 120-1 is allowed to be connected to the distributed system.

At 702, computing platform management service 140 sends a request for edge node 120-1 to geographic location service 150, requesting to assign a geohash to edge node 120-1. At 703, geographic location service 150 generates a corresponding geohash based on a pre-configured setting. For example, a geohash for edge node 120-1 is determined according to a geohash configuration method shown in FIG. 6.

At 704, geographic location service 150 sends, in response to determining the geohash, the geohash to computing platform management service 140. At 705, computing platform management service 140 assigns the geohash to edge node 120-1.

At 706, a child node which can be used as the parent node will be selected. In some embodiments, the selection may be made based on a voting mechanism. It is determined whether the number of requests of edge node 120-1 is less than a threshold. Based on a determination that the number of requests of edge node 120-1 is less than the threshold, operating statuses or performance information such as workloads of various edge nodes in the distributed system are acquired. Based on the operating statuses or performance information such as workloads of the various edge nodes, corresponding scores of the various edge nodes are determined. An edge computing device with the highest score is selected as a new parent node. In the example of FIG. 7, assuming that the distributed system is further provided with edge node 120-2, then based on the above process, it is determined that edge node 120-1 may serve as a parent node.

At 707, a voting result is sent to computing platform management service 140. At 708, computing platform management service 140 requests geographic location service 150 to generate a geohash for an upper-level node for newly selected upper-level edge node 120-1 (the parent node).

At 709, geographic location service 150 generates a new geohash based on a pre-configured setting. At 710, geographic location service 150 responds to the new geohash, for example, sending the new geohash to computing platform management service 140.

At 711, the new parent node is assigned a new geohash, and other child nodes are notified of the new geohash. Computing platform management service 140 assigns the new geohash to edge node 120-1.

In some embodiments, the numbers of requests of various edge devices are obtained periodically; and the parent node is redetermined based on the numbers of requests of the various edge devices. In this way, data in child nodes may be dynamically aggregated, and it is especially suitable for occasions where events are only dense in certain time periods and not dense in other time periods, thereby well balancing the number of requests and the query response speed.

In some embodiments, in response to occurrence of a target event, a child node corresponding to the target event is determined; and the target event is caused to be sent to the first child node if the corresponding child node is the first child node. Each node manages a certain region, and an event that occurs in that region is uploaded to a node of that region first, which is just uniquely determined by geohashes. Therefore, geohashes are used for organizing the architecture of a distributed network, and a distributed system may be decoupled from the conventional network architecture. The parent node and child node are queried directly by using the geohashes, and geo-related data may also reflect a geographical relationship therebetween in a more confidential manner.

Figure 8:
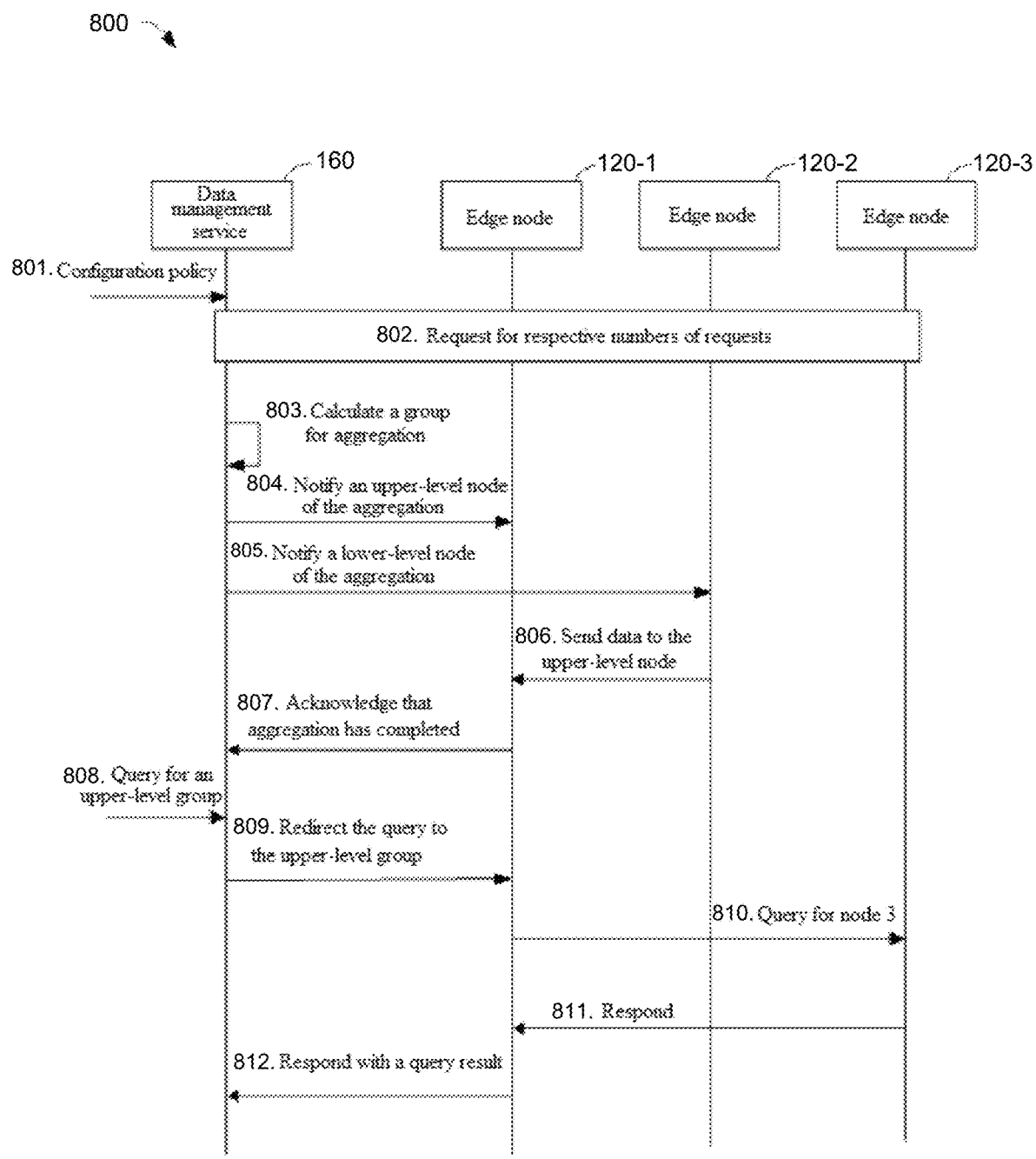
FIG. 8 is a schematic diagram of an aggregation process of nodes according to an example implementation of the present disclosure.

FIG. 8 is a schematic diagram 800 of an aggregation process of nodes according to an example implementation of the present disclosure. Among them, edge node 120-3 is not aggregated. Edge node 120-1 and edge node 120-2 are aggregated together, where edge node 120-1 is a parent node and edge node 120-2 is a child node. After the aggregation, parent node 120-1 will be responsible for maintaining event data for a less busy region, that is, in place of child node 120-2. Edge node 120-3 will maintain its own event data by itself.

At 801, a preset configuration management policy is sent to data management service 160. Based on the configuration management policy, data management service 160 may know how to manage various edge nodes. In the present disclosure, it may be based on the number of requests of each edge node.

At 802, based on the configuration, each edge node managed by the data management service 160 sends requested standard data, and in this case, it is the number of requests in a region covered by a target edge node. For example, the numbers of requests of edge node 120-1, edge node 120-2, and edge node 120-3 are requested.

At 803, once data has been collected from the target edge node, the data management service 160 calculates which edge nodes can be aggregated. For example, data management service 160 obtains through calculation that edge node 120-1 and edge node 120-2 can be aggregated, while edge node 120-3 is not suitable to be aggregated at this time.

At 804, the data management service 160 notifies an upper-level edge node that it is ready to start aggregation. In this example, edge node 120-1 is selected as the parent node, and therefore, data management service 160 notifies edge node 120-1 that it is ready to start aggregation.

At 805, the data management service 160 notifies the target edge node that needs to be aggregated. In this case, data management service 160 notifies edge node 120-2 to aggregate to parent node 120-1.

At 806, the edge node to be aggregated sends data to the upper-level edge node. For example, edge node 120-2 sends data to its parent node 120-1. The data may include data of various events stored by edge node 120-2, data of other transactions managed by edge node 120-2, data of its own performance, and the like (also referred to as metadata).

At 807, the upper-level node sends an acknowledgment to the data management service once the aggregation process is completed (for example, data of the child nodes that should be transmitted has all been transmitted). For example, parent node 120-1 sends to data management service 160 an acknowledgment that the aggregation process has completed.

At 808, the data management service receives a query for an upper-level group (for example, for a group into which parent node 120-1 and child node 120-2 are aggregated).

At 809, the data management service will redirect the query to a target upper-level edge node. For example, the query is sent to parent node 120-1.

At 810, the upper-level edge node forwards the query to a corresponding edge node. In this example, the query request is received by parent node 120-1. If the parent node parses and finds that the query request includes data that it does not have, that is, parent node 120-1 receives a query request for edge node 120-3. At this time, the parent node will forward the request to edge node 120-3.

At 811, the edge node that is not aggregated will determine a response to the query and sends the response to the parent node. For example, edge node 120-3 sends a response to parent node 120-1.

At 812, along with those already aggregated data, data from the non-aggregated node, and data in the upper-level node, the data management service is responded to. For example, the response to the query request includes the data of parent node 120-1 and the data of edge node 120-2 and edge node 120-3, which are then together sent to data management service 160.

Through method 200 of the present disclosure, geohashes can be used for organizing the architecture of a distributed system, and therefore, various edge devices may be better managed based on geographic locations, and the response speed to query requests may be improved. At the same time, the security is improved due to the secrecy of hashes. When aggregating various edge devices, they may be dynamically aggregated according to their degrees of busyness, thereby providing flexibility in aggregating data. Therefore, when responding to a query request, the response speed may be further improved, and the number of query hops and the corresponding delay may be reduced.

Figure 9:
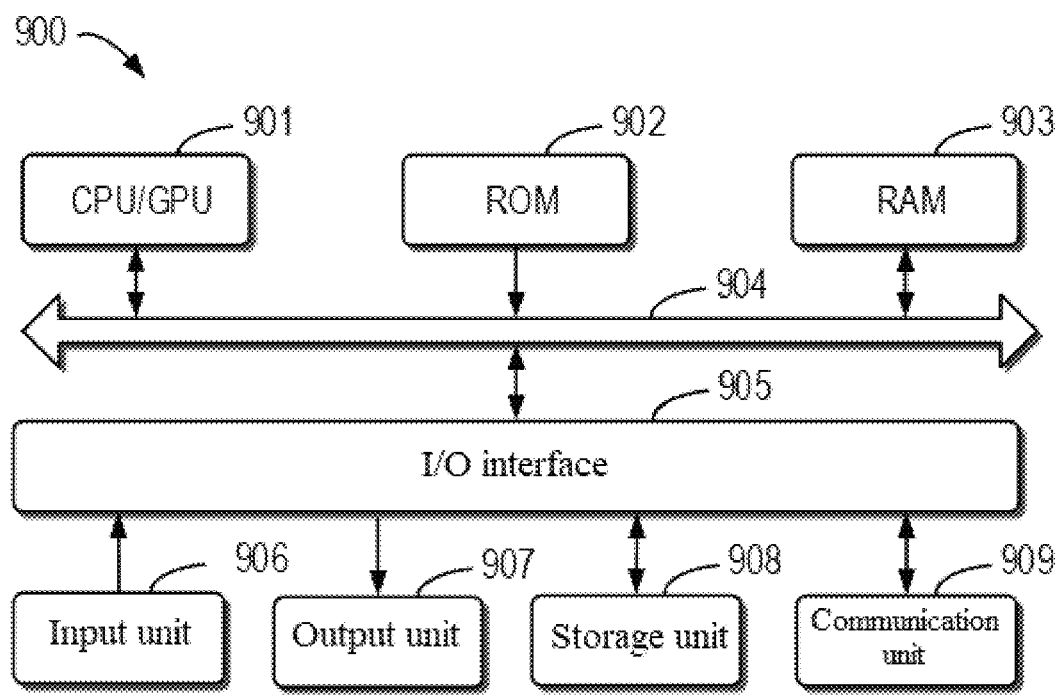
FIG. 9 is a block diagram of a device for processing a query request according to an example implementation of the present disclosure.

FIG. 9 is a block diagram of device 900 that may be used to implement embodiments of the present disclosure. Device 900 may be a device or apparatus described in embodiments of the present disclosure. As shown in FIG. 9, device 900 includes central processing unit (CPU) and/or graphics processing unit (GPU) 901 that may perform various appropriate actions and processing according to computer program instructions stored in read-only memory (ROM) 902 or computer program instructions loaded from storage unit 908 into random access memory (RAM) 903. Various programs and data required for the operation of device 900 may also be stored in RAM 903. CPU/GPU 901, ROM 902, and RAM 903 are connected to each other through bus 904. Input/output (I/O) interface 905 is also connected to bus 904. Although not shown in FIG. 9, device 900 may also include a co-processor.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various methods or processes described above may be performed by CPU/GPU 901. For example, in some embodiments, the method 200 may be embodied as a computer software program that is tangibly included in a machine-readable medium, such as storage unit 908. In some embodiments, part or all of the computer program may be loaded and/or installed onto device 900 via ROM 902 and/or communication unit 909. When the computer program is loaded into RAM 903 and executed by CPU/GPU 901, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or the technical improvements to technologies on the market, so as to enable persons of ordinary skill in the art to understand the embodiments disclosed herein.

What is claimed is:

1. A method comprising:
   determining a first number of requests of a first edge device and a second number of requests of a second edge device in a distributed system;
   determining the first edge device as a parent node and the second edge device as a child node in response to both the first number of requests and the second number of requests being less than a threshold;
   sending to the child node an indication of transmitting data in the child node to the parent node; and
   sending, in response to receiving a query request for the child node, the query request to the parent node.

2. The method according to claim 1, further comprising:
   sending, in response to a third number of requests of a third edge device in the distributed system being greater than the threshold, a query request for the third edge device to the parent node, so that the query request for the third edge device is forwarded to the third edge device.

3. The method according to claim 1, further comprising:
   determining, in response to the parent node receiving the query request, a response to the query request; and
   causing the response to be sent from the parent node.

4. The method according to claim 1, further comprising:
   assigning corresponding geohashes to the parent node and the child node.

5. The method according to claim 4, wherein the geohashes are determined through the following steps:
dividing a geographic region into a first-level grid set;
dividing each first-level grid in the first-level grid set into a second-level grid set; and
determining a geohash for each grid in the first-level grid set and a geohash for each grid in the second-level grid set.

6. The method according to claim 1, further comprising:
assigning, in response to receiving a registration request to register a fourth edge device with the distributed system, a corresponding geohash to the fourth edge device; and
notifying the parent node of the geohash of the fourth edge device.

7. The method according to claim 6, further comprising:
determining whether a fourth number of requests of the fourth edge device is less than the threshold;
acquiring, based on a determination that the fourth number of requests is less than the threshold, operating statuses of various edge devices in the distributed system;
determining, based on the operating statuses of the various edge devices, corresponding scores of the various edge devices; and
selecting an edge computing device with the highest score as a new parent node.

8. The method according to claim 7, further comprising:
assigning a new geohash to the new parent node; and
notifying other child nodes of the new geohash.

9. The method according to claim 1, further comprising:
periodically acquiring the numbers of requests of various edge devices; and
redetermining the parent node based on the numbers of requests of the various edge devices.

10. The method according to claim 1, further comprising:
determining, in response to occurrence of a target event, a child node corresponding to the target event; and
causing the target event to be sent to the child node if the corresponding child node is the child node.

11. An electronic device, comprising:
a processor; and
a memory coupled to the processor, wherein the memory has instructions stored therein, and the instructions, when executed by the processor, cause the electronic device to perform actions comprising:
determining a first number of requests of a first edge device and a second number of requests of a second edge device in a distributed system;
determining the first edge device as a parent node and the second edge device as a child node in response to both the first number of requests and the second number of requests being less than a threshold;
sending to the child node an indication of transmitting data in the child node to the parent node; and
sending, in response to receiving a query request for the child node, the query request to the parent node.

12. The electronic device according to claim 11, wherein the actions further comprise:
sending, in response to a third number of requests of a third edge device in the distributed system being greater than the threshold, a query request for the third edge device to the parent node, so that the query request for the third edge device is forwarded to the third edge device.

13. The electronic device according to claim 11, wherein the actions further comprise:
determining, in response to the parent node receiving the query request, a response to the query request; and
causing the response to be sent from the parent node.

14. The electronic device according to claim 11, wherein the actions further comprise:
assigning corresponding geohashes to the parent node and the child node.

15. The electronic device according to claim 14, wherein the geohashes are determined through the following steps:
dividing a geographic region into a first-level grid set;
dividing each first-level grid in the first-level grid set into a second-level grid set; and
determining a geohash for each grid in the first-level grid set and a geohash for each grid in the second-level grid set.

16. The electronic device according to claim 11, wherein the actions further comprise:
assigning, in response to receiving a registration request to register a fourth edge device with the distributed system, a corresponding geohash to the fourth edge device; and
notifying the parent node of the geohash of the fourth edge device.

17. The electronic device according to claim 16, wherein the actions further comprise:
determining whether a fourth number of requests of the fourth edge device is less than the threshold;
acquiring, based on a determination that the fourth number of requests is less than the threshold, operating statuses of various edge devices in the distributed system;
determining, based on the operating statuses of the various edge devices, corresponding scores of the various edge devices; and
selecting an edge computing device with the highest score as a new parent node.

18. The electronic device according to claim 17, wherein the actions further comprise:
assigning a new geohash to the new parent node; and
notifying other child nodes of the new geohash.

19. The electronic device according to claim 11, wherein the actions further comprise:
periodically acquiring the numbers of requests of various edge devices; and
redetermining the parent node based on the numbers of requests of the various edge devices.

20. A computer program product tangibly stored on a non-transitory computer-readable medium and comprising computer-executable instructions, wherein the computer-executable instructions, when executed by a device, cause the device to implement a method comprising:
determining a first number of requests of a first edge device and a second number of requests of a second edge device in a distributed system;
determining the first edge device as a parent node and the second edge device as a child node in response to both the first number of requests and the second number of requests being less than a threshold;
sending to the child node an indication of transmitting data in the child node to the parent node; and
sending, in response to receiving a query request for the child node, the query request to the parent node.

* * * * *